United States Patent [19]

Amakawa et al.

[11] Patent Number: 5,680,532
[45] Date of Patent: Oct. 21, 1997

[54] METHOD AND APPARATUS FOR PRODUCING ANIMATION IMAGE

[75] Inventors: Koji Amakawa; Ryozo Takeuchi, both of Hitachi, Japan

[73] Assignee: Hitachi, Ltd., Tokyo, Japan

[21] Appl. No.: 218,887

[22] Filed: Mar. 28, 1994

Related U.S. Application Data

[63] Continuation of Ser. No. 968,459, Oct. 29, 1992, abandoned, which is a continuation of Ser. No. 758,459, Sep. 6, 1991, abandoned, which is a continuation of Ser. No. 302,341, Jan. 27, 1989, abandoned.

[30] Foreign Application Priority Data

Jan. 29, 1988 [JP] Japan ................... 63-16985

[51] Int. Cl.$^6$ .................................................. G06F 3/100
[52] U.S. Cl. .......................... 395/173; 395/174; 395/807
[58] Field of Search ............................. 395/100, 118, 395/152, 154, 155, 161, 157, 173, 174, 326, 328, 806, 807

[56] References Cited

U.S. PATENT DOCUMENTS

| | | | |
|---|---|---|---|
| 4,600,919 | 7/1986 | Stern .................................. | 340/725 |
| 4,600,920 | 7/1986 | Oka et al. ........................... | 340/725 X |
| 4,700,181 | 10/1987 | Maine et al. ........................ | 340/724 X |
| 4,711,543 | 12/1987 | Blair et al. ......................... | 340/725 X |
| 4,760,390 | 7/1988 | Maine et al. ........................ | 340/721 X |
| 4,797,836 | 1/1989 | Witek et al. ........................ | 340/725 X |
| 4,894,774 | 1/1990 | McCarthy et al. ................... | 340/725 X |
| 4,905,168 | 2/1990 | McCarthy et al. ................... | 395/152 X |

OTHER PUBLICATIONS

*IEEE Computer Graphics and Applications*, "Articulated figure positioning by Multiple Constraints", N.I. Badler, et al., vol. 7, No. 6, Jun. 1987, New York, NY.

Primary Examiner—Phu K. Nguyen
Assistant Examiner—Cliff N. Vo
Attorney, Agent, or Firm—Antonelli, Terry, Stout & Kraus, LLP.

[57] ABSTRACT

A method and apparatus for producing animation image wherein at least one characteristic value is given to at least one point to be observed in a space in which an animated object is contained, and the position of the animated object is modified in each frame of a plurality of successive frames on the basis of a value obtained through observation by the animated object of at least one of the characteristic values given to the point to be observed.

33 Claims, 7 Drawing Sheets

METHOD AND APPARATUS FOR PRODUCING ANIMATION IMAGE

This application is a continuation of application Ser. No. 968,459, filed Oct. 29, 1992, now abandoned, which is a continuation of application Ser. No. 758,459, filed Sep. 6, 1991, now abandoned, which is a continuation of parent application Ser. No. 302,341, filed Jan. 27, 1989, now abandoned.

BACKGROUND OF THE INVENTION

The present invention relates to a method and an apparatus for producing an animation image by means of a computer, and especially to a method for producing an animation image which can display a variety of motions of objects by varying input data quantitatively.

A conventional system for producing an animation image is discussed, for instance, in "Method of Producing Animation Using Active Characters", by Tetsuya Uchiki and others, as part of a collection of papers filed to the Second NICOGRAPH Paper Contest (Shadanhojin Nippon Computer Graphics Kyokai, 1986), pp. 197 to 206. Based on the result of observation of an object present in a certain area, according to this system, an animated object selects an appropriate one of several patterns of an action model, which are provided beforehand in the form of programs, and moves in accordance with routine specified by these programs. In the production of an animation image of a barracuda attacking a school of herring, for instance, the following action models may be produced for the barracuda and the herring and the selected models are then implemented as programs.

A. Action Model for the Barracuda (1) When a barracuda finds a school of herring, it starts an attack in the direction of the center of the school.

(2) Once turning to an attacking posture, it can not change its action for a length of time even if it misses the school of herring.

B. Action Model for the Herring (1) When herring sense the attack of the barracuda, they select a direction for avoiding the attack based on the positional relationships they have with the barracuda.

(2) When they are not attacked or succeed in avoiding an attack, they select a direction which makes it possible to equalize the positional relationships they have with the neighboring herring as much as possible, while also taking action to form a school.

(3) When there is a possibility of interference (collision or contact) with other herring in proceeding in the direction selected in actions (1) or (2) with reference to the positional relationships they have with other herring in the vicinity, they change their direction to avoid contact.

In the conventional system for producing an animation image, as described above, an animated object perceives the type of an object present in its vicinity and, based thereon, selects a pattern of action.

We have discovered that the above-described conventional system has a problem in that the various actions corresponding to each animated object and each object present in the vicinity of the animated object present in the vicinity of the animated object must be described in the form of different programs for each different action. The conventional system has another problem in that it is difficult to represent a difference between the individual objects of the same type and also an action corresponding to an object having an intermediate property between different types of objects.

SUMMARY OF THE INVENTION

An object of the present invention is to provide a method and an apparatus for producing an animation image which will enable the coordinated production of a basic movement of an animated object (a reference position of the animated object for each frame or other reference time period), without depending on the type of object or the production of motions of various objects, by varying input data quantitatively.

The aforesaid object can be attained by a method and apparatus wherein at least one characteristic, which is not a number for distinguishing a point to be observed or the type or the individual characteristic of an object represented by the point to be observed, is given to at least one point (the point to be observed) in a space in which an animated object is contained, and the position of the animated object is modified in each of a plurality of successive frames on the basis of a value obtained through observation by the animated object of at least one of the characteristics given to the point to be observed.

The cause of the above-described problems of the conventional system is that the observation by the animated object of objects in its vicinity is directed to the type of an object in its vicinity. According to the conventional system, in other words, the type of object in its vicinity is used as a basis for control over the action of the animated object, and therefore action models corresponding to each type of animated object and each type of object in the vicinity of the animated object, and programs for each action model, are necessary.

When one characteristic value or more is given to each point (point to be observed) in the space in which the animated object is contained and when the action of the animated object is produced on the basis of a value obtained through observation by the animated object of at least one of the characteristic values given to the point to be observed, it is unnecessary to describe a program corresponding to each type of object in the vicinity, since the production of the action is based on the characteristic value which is not intended to distinguish the type or individual characteristic of the object. Also, it becomes unnecessary to describe a program for each type of animated object, if one uses generally a method of producing a basic movement or the whole movement of the animated object from the value obtained through observation. In addition, the difference between individual objects of the same type and an action corresponding to an object having an intermediate property between different types can be represented easily by selective assignment of the characteristic value.

DETAILED DESCRIPTION OF THE PREFERRED EMBODIMENTS

In the following description of the preferred embodiments, it should be remembered that the method of the present invention is performed in a computer system operating under control of a stored program. Various systems will be discussed in connection with FIGS. 9-11 and 13 after discussion of various embodiments of the method of this invention.

Figure 1:
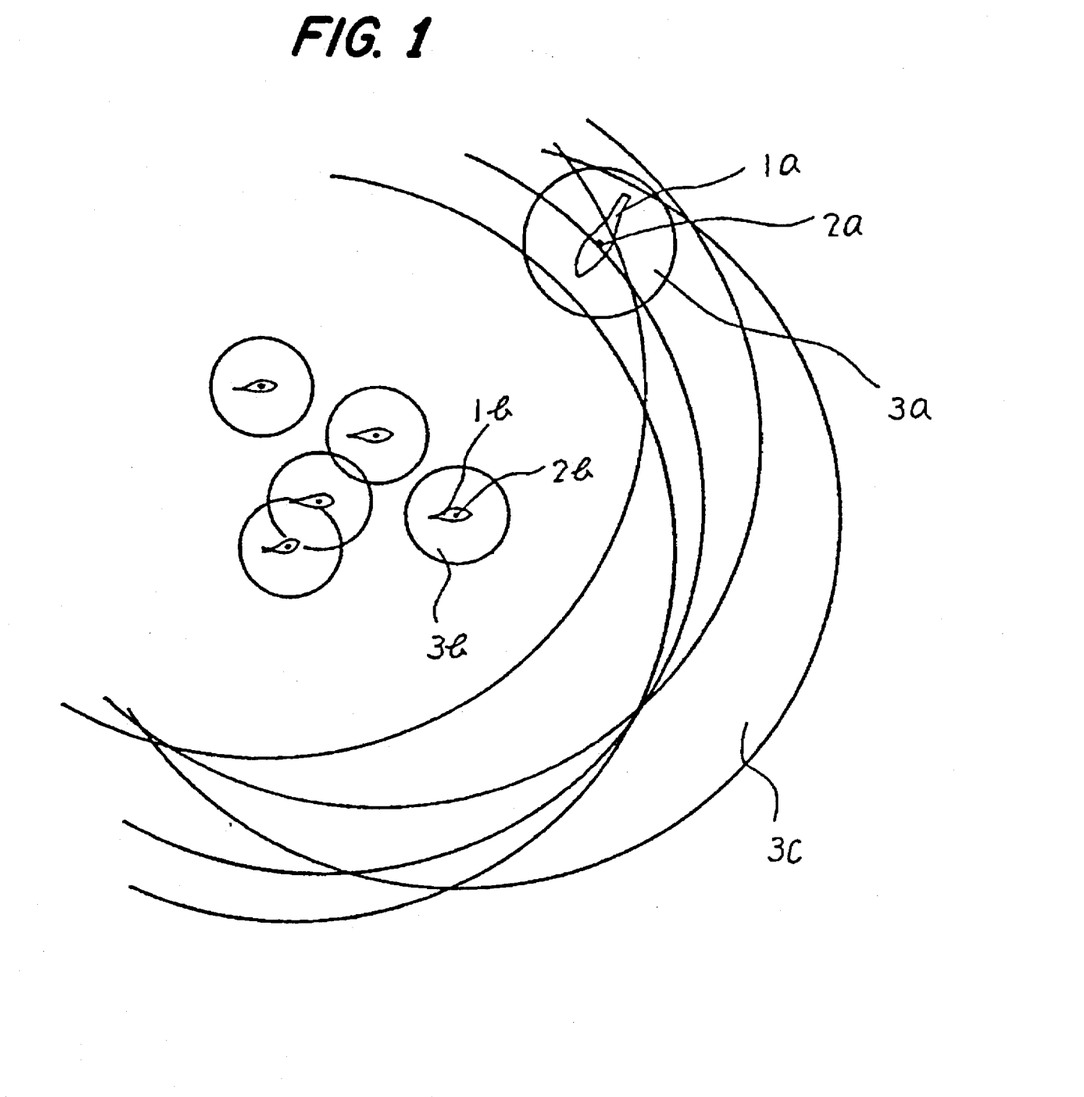
FIG. 1 illustrates the setting of conditions of one embodiment of the present invention.

One embodiment of the present invention will be described hereinunder with reference to FIG. 1. FIG. 1 shows an example of conditions for producing, by the method of the present invention, an animation of a barracuda attacking a school of herring, as displayed on the screen of a display device 100, which is the example used for the conventional system described previously. The barracuda and the herring are denoted respectively by an animated object 1a and animated objects 1b, and they are provided with a point to be observed 2a and a point to be observed 2b, respectively. All of the objects being displayed are animated objects in this example, and when viewed from any one object, the points representing all of the other objects are referred to as the points to be observed.

The point 2a representing the barracuda 1a is given an information identifying characteristic value of "−10", while the point 2b representing the herring 1b is given an information identifying characteristic value of "1". An observed value of the characteristic value of the point 2a representing the barracuda is set at −10 in an area 3a having a radius of 500 units from the barracuda, which identifies a constant corresponding to the distance from the barracuda, and is set at 0 outside the area 3a. In this and the following description, the term "units" is used as a generic term to include any appropriate dimension, it being recognized that purposes of an exemplary description actual dimensions are unnecessary where relative relationships suffice to provide a full understanding of the features being described. An observed value of the characteristic value of the point 2b representing the herring is set at 1 in an area 3c of a radius of 200 units or more, but less than 3000 units, from the herring, and is set at 0 in an area of a radius of 3000 units or more. In an area 3b of a radius smaller than 200 units from the herring, a value observed by another herring is set at −1, while a value observed by the barracuda is set at 1.

To produce an animation, the velocity, acceleration and direction of each object are controlled during successive display frames according to a certain relationship based on the characteristic value and mass of the respective objects.

The control of an acceleration of each object is performed by using as the acceleration a vector having a force which is proportional to an observed value of a characteristic value given to a point or points representing another object or objects (i.e. a point to be observed), and which is directed to the point or points to be observed. The force of the vector is obtained by adding the characteristic value of all points to be observed, other than the characteristic value of its own point, to produce a composite vector, which is then divided by its mass. The mass of the barracuda is set at 0.02, and that of the herring at 0.01, for example. In addition, the maximum velocity of the barracuda is set at 500 units, while the maximum velocity of the herring is set at 200 units, and these velocities are designed not to be exceeded.

This setting of conditions produces an animation in the following way. When viewed from the barracuda located within a distance of 3000 units from one of the herring, this herring is a point having a value of 1, and the barracuda has a force of 1 exerted on itself in the direction of that herring. As a result, a resultant of forces directed from each herring acts on the barracuda, and an acceleration obtained by dividing the resultant of these forces by the mass 0.02 of the barracuda is generated. In the example of FIG. 1, there are five herring each having a characteristic value of 1; and so, the resultant of forces is 5 and the acceleration will be 5÷02=250 units acceleration. Thus, the position of the barracuda is modified in successive frames, with the result that an animation of the barracuda chasing the herring is produced. When viewed from a herring located within a distance of 500 units from the barracuda, likewise, the barracuda is a point having a value of −10, and the herring has a force of −10 exerted on itself in the direction of the barracuda, that is, a force of +10 is exerted in the opposite direction to the barracuda. As a result, an acceleration of 1000 units is obtained by dividing the force of +10 by the mass 0.01 of the herring for this herring in the opposite direction to the barracuda, and thus the position of the herring is modified in successive frames, and an animation of the herring fleeing from the barracuda is produced.

When one herring observes another in an area within a distance less than 3000 units therefrom, a force of +1 is exerted in the direction of the latter when the distance between them is 200 units or more, while the force of +1 acts in the opposite direction to the latter when said distance is less than 200 units. It is for representing territories of herrings as individuals that they are assumed to be repellant to each other within a distance less than 200 units. In this way, an action of each member in a school to stay away at some distance from others is produced.

Under the above-described conditions, a basic movement (a reference position of each animated object at each frame time) in the animation of the barracuda attacking the school of herring is produced by a coordinated program that is not based on the type of animated object. To complete the animation, the overall action is supplemented adding a fluctuation or a characteristic movement to the basic movement of the action thus produced. The characteristic movement is dependent on the type of animated object, and it refers to the motion of each component or part constituting the animated object. In this embodiment, the respective swimming motions of the barracuda and the herring are the characteristic movements of the action.

In the present embodiment, motions in a three-dimensional space are produced. In the case of this three-dimensional space, it is difficult generally to specify the motions, since the degree of freedom of motions of objects is larger than that in a two-dimensional space. In the present embodiment, however, the same degree of ease as provided in the case of the two-dimensional space is attained, because the basic movements are produced automatically. While the present invention can be applied to both two-dimensional and three-dimensional spaces, it shows in effect, in the three-dimensional space in particular, that data for producing motions can be set with ease.

Figure 2A:
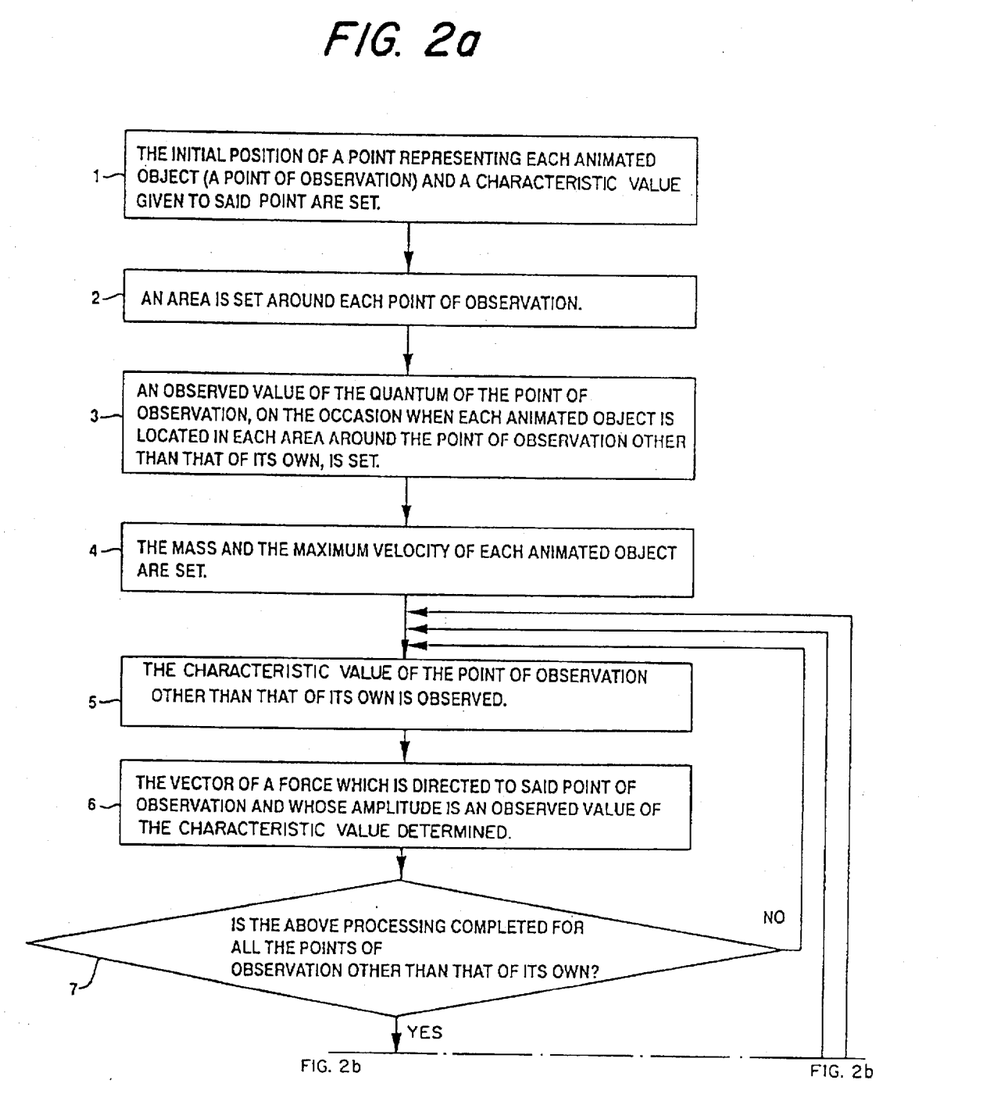
FIGS. 2A–2B are flow charts of production of an action in FIG. 1.
Figure 2B:
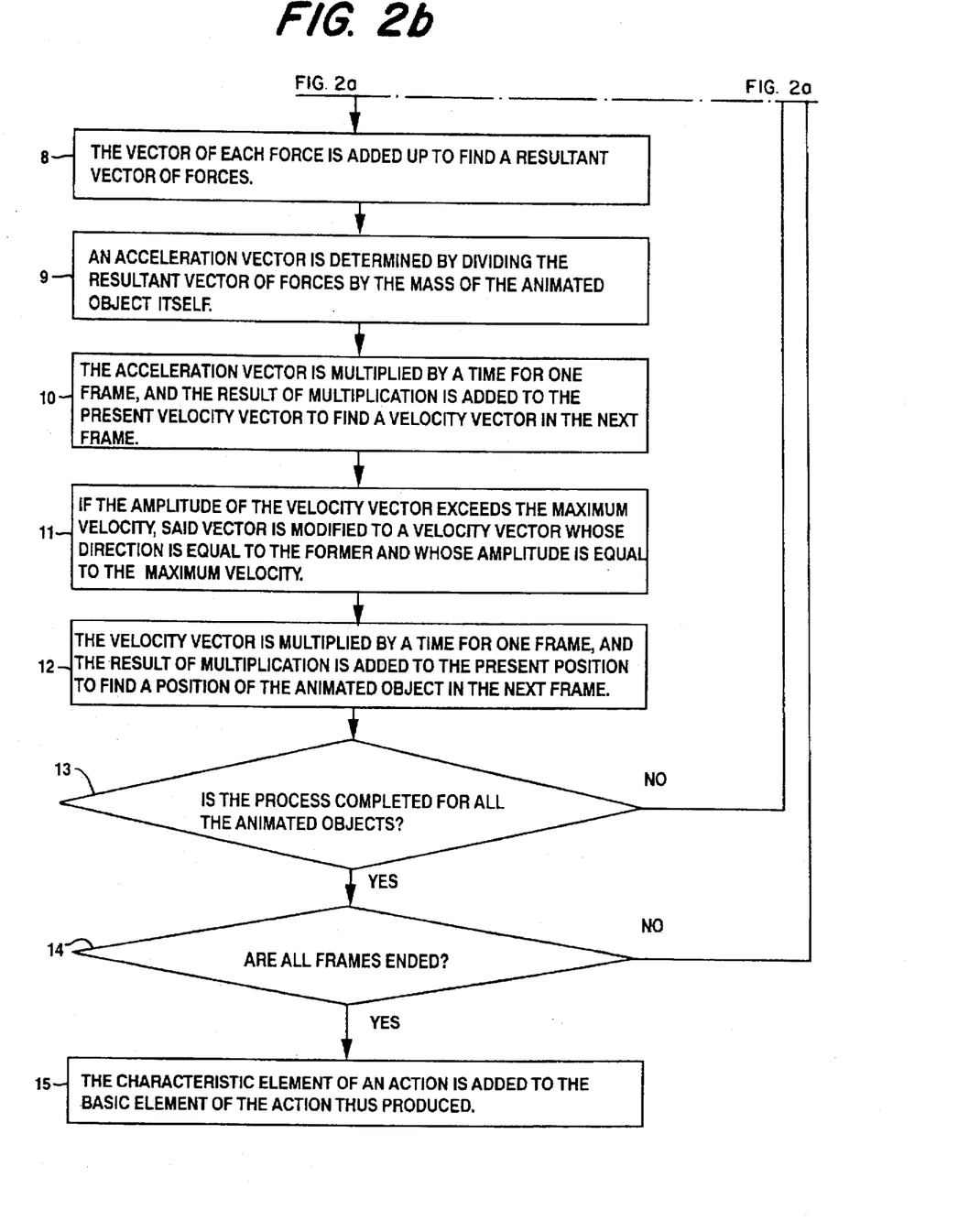

FIG. 2 shows method steps for production of the action of an animated object in accordance with one embodiment of the present invention as described above.

Step 1. The initial position (coordinates) of points representing respective animated objects (a point of observation) and a characteristic value given to each point are inputted and stored in a memory.

Step 2. The dimensions of an area around each point to be observed are inputted and stored in the memory.

Step 3. An observed value of the characteristic value of a point to be observed, on the occasion when each animated object is located in the designated area around the point to be observed, is inputted and stored in the memory.

Step 4. Values of the mass and the maximum velocity of each animated object are inputted and stored in the memory.

Step 5. The characteristic value of the points to be observed by an animated object, other than its own characteristic value, are determined for each animated object (the point of observation) for a given frame.

Step 6. The vector of a force which is directed to each point of observation and whose amplitude is an observed value of the characteristic value is determined for the given frame.

Step 7. Is the above processing completed for all points to be observed other than its own? If no, return to step 5.

Step 8. The vector of each force for each given animated object is added to find a resultant vector of forces for the given frame.

Step 9. An acceleration vector is determined by dividing the resultant vector of forces by the mass of the animated object itself for the given frame.

Step 10. The acceleration vector is multiplied by a time for display of the given frame, and the result of this multiplication is added to the present velocity vector to find a velocity vector for the next frame.

Step 11. If the amplitude of the velocity vector exceeds the designated maximum velocity for the animated object, said vector is modified to a velocity vector whose direction is equal to the former and whose amplitude is equal to the maximum velocity.

Step 12. The velocity vector is multiplied by a time for display of the given frame, and the result of multiplication is added to the present position to find a position of the animated object in the next frame.

Step 13. Is the process completed for all the animated objects? If no, return to step 5.

Step 14. Are all frame ended? If no, return to step 5.

Step 15. The characteristic movement of an action is added to the basic movement of the action thus produced for all frames.

When it is desired to represent a difference in individual herring, for instance, in this embodiment, it is only required that the characteristic value given to the points representing the herring are made to be non-uniform characteristic values, such as 1.0, 0.9, 1.2, 1.1 and 0.8, for instance. In the case when it is desired to show an object having an intermediate property between the barracuda and the herring, it is only needed to give it an intermediate value between the data information given to the barracuda and the herring. The motions of various objects can be produced by varying input data quantitatively in this way.

Next, another embodiment of the present invention will be described with reference to FIG. 3. A characteristic value. Xo is given to a point 2 to be observed which represents an object 7. The characteristic value Xo has a value of C, in this example. An animated object 1 has an evaluation function $f(x)$ which serves as an evaluation criterion for the object 7 to be observed. In this example, the evaluation function is a function $f(x)=Ax$ in which multiplication of the characteristic value Xo by a constant A is performed. Moreover, an area 3 is selected in which the characteristic value C is applied to the characteristic value of the point 2. Thus, the value x of the characteristic value of the point 2 observed by the animated object 1 is 0 when the position of the animated object 1 is located outside the area 3, and $x_x$ (=C) when said position is located inside the area. The position of the animated object 1 in each frame is modified on the basis of a value obtained by substituting this observed value x for the evaluation function $f(x)$. In the present example, at the time when a force 6 proportional to the value of the evaluation function $f(x)$ and directed to the point 2 is made to act on the animated object 1, the acceleration is determined repeatedly in successive frames by dividing the force 6 by a mass given to the animated object 1, and thereby the basic movement of the action is produced. In other words, an acceleration directed to the point 2 is given to the animated object 1 when the value of the evaluation function $f(x)$ is positive, while an acceleration directed in the opposite direction is given thereto when said value is negative. On this occasion, a limit to the velocity of the animated object 1 is provided so that the velocity may not seem unnatural. A reference position of the animated object in each frame, which represents the basic movement of the action, is produced by this method.

Furthermore, a characteristic movement of the object is added to this basic movement of the action. Since the animated object 1 is a butterfly in this example, a characteristic movement, such as a flapping motion in rising and a gliding motion in lowering, are added to the aforesaid basic movement of the action. In this way, a more natural action of the animated object is produced.

The characteristic value given to the point to be observed may be regarded also as the quantitative representation of the property of the point to be observed or the property of the object represented by the point. Besides, the evaluation function given to the animated object (the point of observation) may be regarded also as the representation of the affinity or attraction of the animated object for the property of the point of observation. The characteristic value obtained by substituting an observed value of the characteristic value of the point for the evaluation function may be regarded also as the representation of an affinity which the animated object feels for the point to be observed or the object represented thereby, or that a psychological attraction to the point or a physical attraction resulting from said attraction.

When the types of animated objects are different, the evaluation function or the mass thereof is varied. In the present embodiment, the way of approach of the animated object 1 to the object 7 and that of withdrawal of the former from the latter are varied when the value of the constant A in the evaluation function $f(x)$ is changed, for instance, and the extent of a change in the action is varied when the mass is changed. Accordingly, the basic element of the action can be produced in a coordinated manner, independently of the type of animated object being displayed. The characteristic element of the action may be produced also for each type of animated object. When the animated object is a man, for instance, a walking motion at a low velocity and a running motion at a high velocity may also be added to the basic element of the action.

Figure 3:
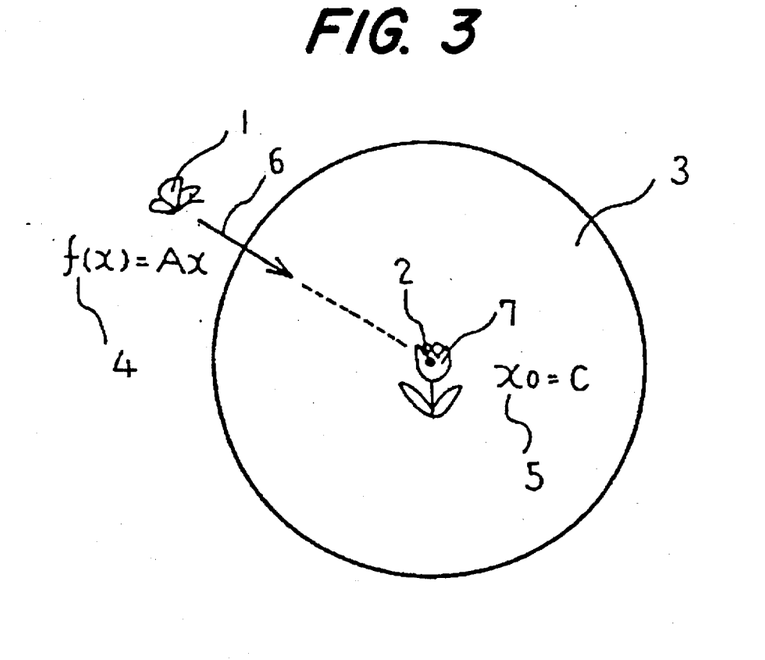
FIGS. 3–8 illustrate the setting of conditions for other embodiments of the present invention.

While the number of animated objects (the point of observation) and that of the point to be observed are set at 1, respectively, in the case of FIG. 3, the same effect is attained also in the case when either one or both of them comprise a plurality of points to be observed. In the latter case, the vectors of a plurality of forces are generated simultaneously in the same way as in the previously-described embodiment shown in FIG. 1, and therefore the acceleration may be calculated by using a resultant vector.

Figure 4:
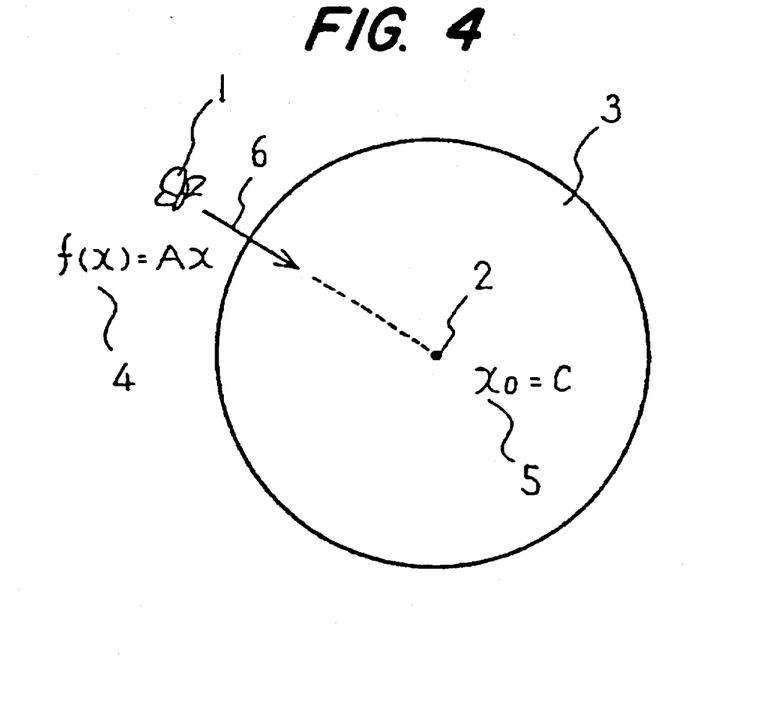

A third embodiment of the present invention is shown in FIG. 4. This embodiment is different from the embodiment shown in FIG. 3 in that the point 2 to be observed is not a point representing an animated object in the space to be displayed, however, it is the same as the other embodiment in other respects. By setting said point at an arbitrary position in this way, the action of the animated object can be controlled with respect to arbitrary positions in space.

The method wherein the value obtained through observation by the animated object of the characteristic value given to the point to be observed is so set as to be dependent on the positional relationship between the object and the point is not limited to those described in the above embodiments, and a variety of methods can be thought of in this relation.

In a variation of the third embodiment of the present invention, a relation of $x=g(x_x, r)$ is employed instead of setting the area 3 of FIG. 3. Herein the mark x denotes the value obtained through observation by the animated object of the characteristic value given to the point to be observed, $x_x$ the characteristic value given to the point to be observed, r a distance between the animated object and the point to be observed, and g a function of the two variables, $x_x$ and r. When $g(x_x, r) = x_x \cdot e^{-r}_E$, is set, for instance, the observed value of the characteristic value given to the point to be observed diminishes continuously as the distance between the point and the animated object increases. When the function g is set as a substantially continuous function in this way, the observed value of the characteristic value given to the point to be observed is varied continuously. Therefore a force applied to the animated object also is varied continuously, and thus a smooth movement is produced.

Figure 5:
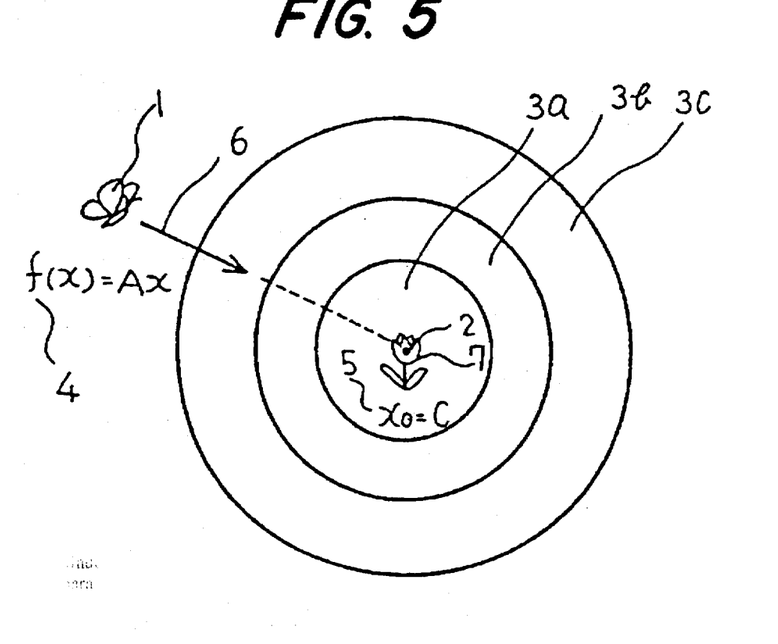

A fifth embodiment of the present invention is shown in FIG. 5. This differs from the embodiment of FIG. 3 in that the area comprises a plurality of strata, and in the present example, it comprises three strata denoted by 3a, 3b and 3c. The value x obtained through observation by the animated object 1 of the characteristic value $x_x$ (=C) given to the point 2 representing the object 7 is set to be x=C when the position of the animated object is located in the area 3a, x=C/2 in the area 3b, x=C/4 in the area 3c, and x=0 outside these areas. According to this method, the variation in the value obtained through observation by the animated object 1 of the characteristic value given to the point 2 to be observed, which is in accord with the position of the animated object 1, becomes more moderate than in the embodiment FIG. 3, and as the result, a smoother movement is produced.

Figure 6:
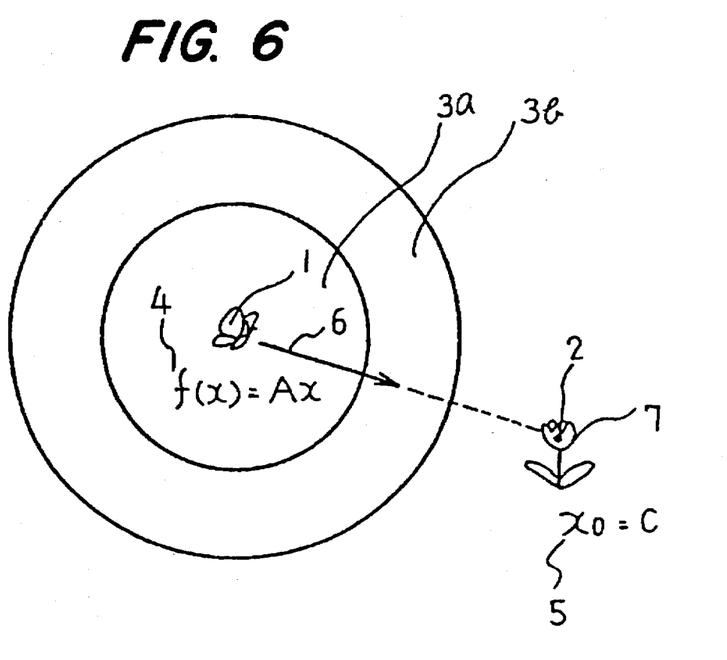

A sixth embodiment of the present embodiment is shown in FIG. 6. This differs from the embodiment of FIG. 5 in that an area of two strata is set for the animated object in this example, denoted by 3a and 3b, around the animated object 1. The value x obtained through observation by the animated object 1 of the characteristic value $x_x$ (=C) given to the point 2 representing the object 7 is set to be x=C when the position of the point 2 to be observed is located in this area 3a, and x=C/2 in the area 3b, in this example. It is effective to set the area for the animated object as in the present embodiment in the case when the observation of the point to be observed by the animated object is dependent on the ability of observation by the animated object.

Figure 7:
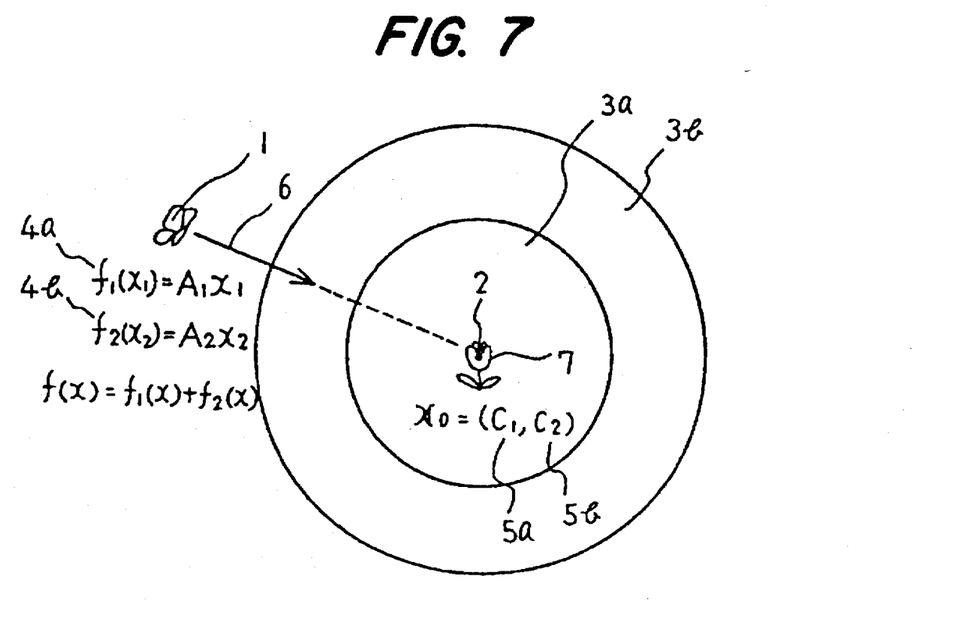

A seventh embodiment of the present invention is shown in FIG. 7. This differs from the embodiment of FIG. 3 in the following respects. Quanta $C_1$ (=Cy) and $C_2$ (=Cz) are given to the point 2 to be observed representing the object 7 as if there were two parts to be observed, respectively, areas 3a and 3b wherein said points can be observed respectively are set, and moreover the animated object 1 is given evaluation functions fy ($x_y$) and $f_z$ ($x_z$) which become evaluation criteria for evaluating observed values $x_y$ and $x_z$ of the characteristic values $C_1$ and $C_2$, respectively, while a comprehensive evaluation function is given by calculating (e.g. summing up) the individual evaluation functions $f_y$ and $f_z$. This method makes it possible to represent a plurality of properties of the object represented by the point to be observed, and thereby to produce an action of the animated object corresponding to these properties.

Figure 8:
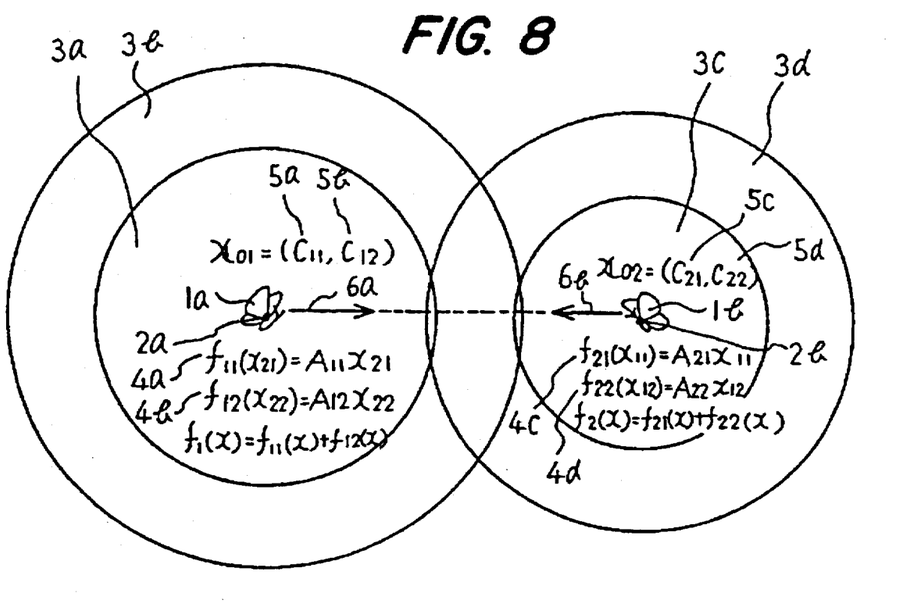

An eighth embodiment of the present invention is shown in FIG. 8. This embodiment is different from that of FIG. 7 in that points 2a and 2b to be observed, which represent two animated objects 1a and 1b, respectively, are set for these objects, and moreover characteristic values $C_{11}$, $C_{12}$, $C_{21}$ and $C_{22}$ given to said points to be observed, areas 3a, 3b, 3c and 3d wherein said characteristic values can be observed, and evaluation functions $f_{11}$, $f_{12}$, $f_{21}$ and $f_{22}$, are set therefor, respectively. This method makes it possible to produce actions whereby the animated objects have an effect on each other.

In still another embodiment of the present invention, the animated object is the face of a man, and the amount of a change in the shape therefor, i.e. the expressions of the face, is controlled. Feelings are represented by combinations of three quanta, a degree of unexpectedness, a degree of tension and a degree of depression in spirits, and data on typical examples is prepared wherein the combinations of these three quanta representing typical feelings and the positions and postures of parts of the face on the occasion are made to correspond to one another. For said three characteristic values, the characteristic values are used which have been obtained by a method wherein three observed values obtained when three kinds of characteristic values given to points to be observed have been observed from the position of the face, the animated object, are substituted for evaluation functions given to the animated object and corresponding to the degree of unexpectedness, the degree of tension and the degree of depression in spirits, respectively. The position and posture of each part of the face in each of at least one frame are determined by interpolating the values of these three evaluation functions in the data on the aforesaid typical examples, respectively, and thus the expressions of the face are produced.

Figure 9:
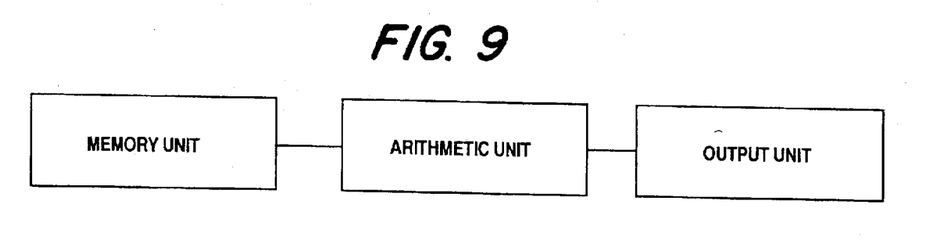
FIGS. 9–11 show examples of construction of animation image producing systems to which the method of the present invention is applied.

FIG. 9 shows an example of the construction of an animation image producing apparatus to which the animation image producing method according to the present invention is applied. Data stored in a memory unit is sent to an arithmetic unit, animation image data is produced from said data by using the animation image producing method of the present invention, and the data thus produced is delivered to an output unit. The output unit may be a display unit which converts the animation image data into an animation image and display the same.

In other words, FIG. 9 shows an animation image producing apparatus comprising a memory unit which stores an animated object given motion, at least one point to be observed in an n-dimensional (n≧2) space (preferably a three-dimensional space) in which said animated object is contained, and at least one characteristic value given beforehand to said point to be observed the arithmetic unit which modifies in each of at least one frame the position of the aforesaid animated object on the basis of at least one of characteristic values given beforehand to the aforesaid point to be observed which is viewed from the animated object; and the output unit which delivers the result of operation of said arithmetic means.

Besides, the apparatus of FIG. 9 may also be an animation image producing apparatus having a memory means which stores the animated object given motion, at least one point to be observed in the n-dimensional (n≧2) space in which said animated object is contained, at least one evaluation criterion given beforehand to the aforesaid animated object, and at least one property given beforehand to said point to be observed; an arithmetic means which modifies in each of at least one frame the position of the animated object on the basis of at least one evaluation criterion given beforehand to said animated object and at least one of the properties given beforehand to the aforesaid point to be observed which is viewed from the aforesaid animated object; and a memory means which stores the result of operation of said arithmetic means.

Figure 10:
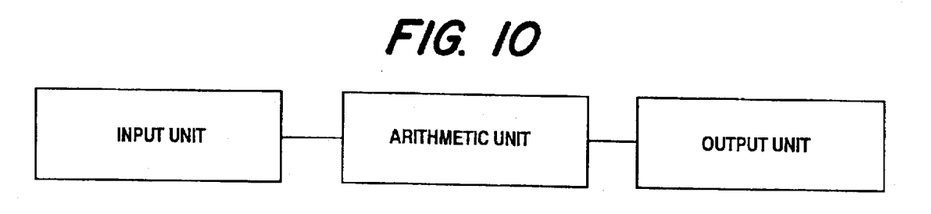

FIG. 10 shows another example of construction of the animation image producing apparatus to which the animation image producing method according to the present invention is applied. Data inputted from an input unit is sent to an arithmetic unit, animation data is produced from said data by using the animation image producing method of the present invention, and the data thus produced is delivered to an output unit. The output unit may also be a display unit which converts the animation image data into an animation image and displays the same.

In other words, FIG. 10 shows an animation image producing apparatus having an input means which inputs the animated object given motion, at least one point to be observed in the n-dimensional (n≧2) space in which said animated object is contained, and at least one characteristic value given to said point to be observed, an arithmetic means which modifies in each of at least one frame the position of the aforesaid animated object on the basis of at least one of characteristic value given to the aforesaid point to be observed which is viewed from the animated object, and an output means which delivers the result of operation of said arithmetic means.

Besides, the apparatus of FIG. 10 may also be an animation image producing apparatus having an input means which inputs the animated object given motion, at least one point to be observed in the n-dimensional (n≧2) space in which said animated object is contained, at least one evaluation criterion given to the aforesaid animated object, and at least one property given to said point to be observed, an arithmetic means which modifies in each of at least one frame the position of the animated object on the basis of at least one evaluation criterion given to said animated object and at least one of properties given to the aforesaid point to be observed which is viewed from the aforesaid animated object, and an output means which delivers the result of operation of said arithmetic means.

Figure 11:
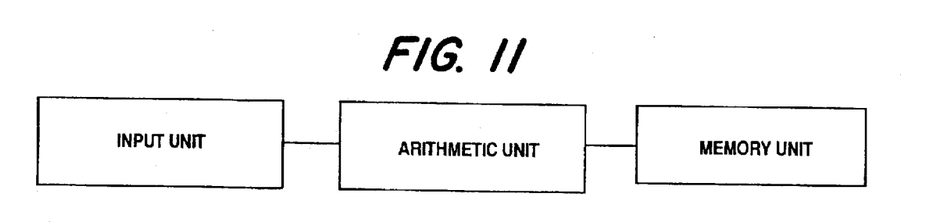

FIG. 11 shows still another example of construction of the animation image producing apparatus to which the animation image producing method according to the present invention is applied. Data inputted from an input unit is sent to an arithmetic unit, animation image data is produced from said data by using the animation image producing method of the present invention, and the data thus produced is stored in a memory unit.

In other words, FIG. 11 shows an animation image producing apparatus having an input means to input the animated object given motion, at least one point to be observed in the n-dimensional (n≧2) space in which said animated object is contained and at least one characteristic given to said point to be observed, an arithmetic means for modifying the position of the aforesaid animated object on the aforesaid animated object on the basis of at least one quanta given to the aforesaid point to be observed which is viewed from the animated object in each of at least one frame, and a memory means to store the result of operation of said arithmetic means.

Besides, the apparatus of FIG. 11 may also be an animation image producing apparatus having an input means which inputs the animated object given motion, at least one point to be observed in the n-dimensional (n≧2) space in which said animated object is contained, at least one evaluation criterion given to the aforesaid animated object and at least one property given to said point to be observed, an arithmetic means which modifies the position of the animated object on the basis of at least one evaluation criterion given to said animated object and at least one of the properties given to the aforesaid point to be observed which is viewed from the aforesaid animated object, and a memory means which stores the result of the operation of said arithmetic means.

Moreover, an animation image producing apparatus constructed by combining the apparatus of FIG. 9 with that of FIG. 11 can also be considered, as will be described in more detail later with reference to FIG. 13.

As one variant of the present invention, for instance, there is an animation image producing apparatus having an input-memory means to input and store the animated object given motion, at least one point to be observed in the n-dimensional (n≧2) space in which said animated object is contained and at least one characteristic value given to said point to be observed, an arithmetic means to modify the position of the aforesaid animated object in each of at least one frame on the basis of at least one of quanta given to said point to be observed which is viewed from the animated object, a memory means to store the result of operation of said arithmetic means, and an output means to deliver the result of operation of the aforesaid arithmetic means.

In addition, an animation image producing apparatus having an input-memory means which inputs and stores the animated object given motion, at least one point to be observed in the n-dimensional (n≧2) space in which said animated object is contained, at least one evaluation criterion given to the aforesaid animated object and at least one property given to said point to be observed, an arithmetic means which modifies the position of the animated object in each of at least one frame on the basis of at least one evaluation criterion given to said animated object and at least one of properties given to the aforesaid point to be observed which is viewed from the aforesaid animated object, a memory means which stores the result of operation of said arithmetic means and an output means which delivers the result of operation of the aforesaid arithmetic means.

Figure 12:
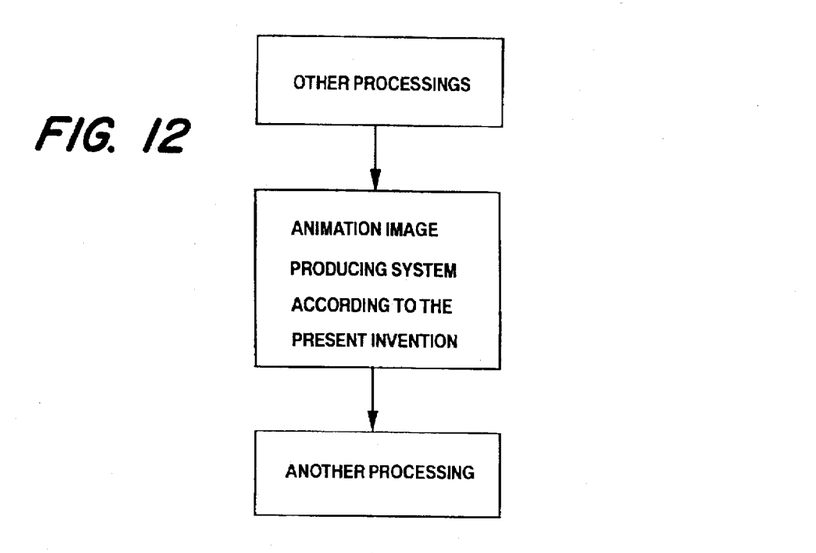
FIG. 12 shows an example of the composition of an animation image producing method to which the system of the present invention is applied.

FIG. 12 shows an example of construction of an animation image producing method to which the animation image producing system according to the present invention is applied. Animation image data is produced from data subjected to other processings, by using the animation image producing system of the present invention, and further another processing is applied to that data.

While several kinds of embodiments of the present invention are described herein, the present invention is not limited to them, and a variety of other variants may also be considered. For example, it can be considered, as variants, to form the area in a complicated shape, to shift the direction of the force from the direction to the point of observation, to vary the characteristic value given to said point and the observed value thereof according to time, to use the value of the evaluation function to control the characteristic element of the action, etc.

Since the action of the animated object is produced on the basis of the value obtained through observation by the animated object of the quantum given to the point to be observed, according to the present invention, the production of the basic element of the action can be implemented in a coordinated manner independently of the type of animated object, or various motions of the animated object can be produced by varying input data quantitatively.

FIG. 13 shows a typical image processing apparatus of the type to which the present invention is applicable. In FIG. 13, an input unit 10, including a mouse 11, a joy stick 12 and a keyboard 13, provides input data and commands to an arithmetic unit 14, which operates to process the inputted data in accordance with the commands under control of a stored program. The arithmetic unit 14 includes a main processing unit 43 and a floating-point processing unit 44 connected via a system bus 42 to an external memory 16, which stores data used in the image processing. A graphic controller 45 is also connected to the system bus 42 and operates to control input and output of graphic data to a frame memory 47 and to a video signal output interface 46 connected to a CRT display 15 for displaying graphic data including the animation image in accordance with the present invention. The operation of such an image processing apparatus under software control is well-known, and so a detailed description herein is unnecessary. It is to be understood that the method of the present invention is implemented in such an image processing apparatus using software based on the flow chart of FIG. 2, for example, and the more detailed description of the features of the invention provided herein.

Although the present invention has been described in connection with a preferred embodiment thereof, many variations and modifications could be made. It is intended to cover all of the variations and modifications which fall within the scope of the present invention, as recited in the following claims.

What is claimed is:

1. A method of producing an animation image of motion of an animated object in an image processing apparatus, comprising the steps of:

storing, by the image processing apparatus, in a memory connected to the image processing apparatus information indicating an effect of a motion of a second animated object on a motion of a first animated object, corresponding to said second animated object;

modifying, by the image processing apparatus, said motion of said first animated object based on said information and said motion of said second animated object; and displaying, by the image processing apparatus on a display screen connected to the image processing apparatus, said modified motion of said first animated object and said motion of said second animated object, wherein said information comprises data identifying a quantum of said effect which varies with distance between said second animated object and said first animated object.

2. A method of producing an animation image according to claim 1, wherein said information comprises data identifying a quantum representing how said first animated object approaches or avoids said second animated object when said second animated object moves.

3. A method of producing an animation image according to claim 2, wherein said data identifying a quantum represents a distance to be maintained from said second animated object, and wherein said modifying step includes the step of:

modifying, by the image processing apparatus, said motion of said first animated object based on said data identifying quantum, position information of said first animated object and said second animated object, and said motion of said second animated object, when said second animated object moves.

4. A method of producing an animation image according to claim 2, wherein said data identifying a quantum is related to an area provided around said second animated object, and wherein said modifying step includes the step of:

modifying, by the image processing apparatus, said motion of said first animated object based on said data identifying a quantum, position information of said first animated object and said second animated object, and said motion of said second animated object, when said second animated object moves.

5. A method of producing an animation image according to claim 2, wherein said data identifying a quantum is a function of distances to be maintained from said second animated object, and wherein said modifying step includes the step of:

modifying, by the image processing apparatus, said motion of said first animated object based on said data identifying a quantum, position information of said first animated object and said second animated object, and said motion of said second animated object, when said second animated object moves.

6. A method of producing an animation image according to claim 1, wherein said modifying step includes the step of:

modifying, by the image processing apparatus, said motion of said first animated object by changing a value of acceleration of said first animated object based on said information and said motion of said second animated object.

7. A method of producing an animation image according to claim 1, wherein said modifying step includes the step of:

modifying, by the image processing apparatus, said motion of said first animated object by changing a force vector of said first animated object based on said information and said motion of said second animated object.

8. A method of producing an animation image of motion of an animated object in an image processing apparatus, comprising the steps of:

storing, by the image processing apparatus, in a memory connected to the image processing apparatus first information which identifies an initial position and an initial motion of first and second animated objects, second information which identifies an area provided around said second animated object, and third information of a quantum representing how said first animated object and second animated object approach or avoid each other in said area;

modifying, by the image processing apparatus, said first information of at least one of said first and second animated objects based on said third information when said second animated object moves relative to said first animated object causing a position of said first animated object to be included in said area identified by said second information; and displaying, by the image processing apparatus on a display screen connected to the image processing apparatus, position and motion of said at least one of said first and second animated objects based on said modified first information and displaying position and motion of the other one of said first and second animated objects.

9. An image processing apparatus for producing an animation image of motion of an animated object, comprising:
   means for storing information indicating an effect of a motion of a second animated object on a motion of a first animated object, corresponding to said second animated object;
   means for modifying said motion of said first animated object based on said information and said motion of said second animated object; and
   means for displaying said modified motion of said first animated object and said motion of said second animated object,
   wherein said information comprises data identifying a quantum of said effect which varies with distance between said second animated object and said first animated object.

10. An image processing apparatus for producing an animation image according to claim 9, wherein said information comprises data identifying a quantum representing how said first animated object approaches or avoids said second animated object when said second animated object moves.

11. An image processing apparatus for producing an animation image according to claim 10, wherein said data identifying a quantum represents a distance to be maintained from said second animated object, and wherein said modifying means comprises:
   means for modifying said motion of said first animated object based on said data identifying a quantum, position information of said first animated object and said second animated object, and said motion of said second animated object, when said second animated object moves.

12. An image processing apparatus for producing an animation image according to claim 10, wherein said data identifying a quantum is related to an area provided around said second animated object, and wherein said modifying means comprises:
   means for modifying said motion of said first animated object based on said data identifying a quantum, position information of said first animated object and said second animated object, and said motion of said second animated object, when said second animated object moves.

13. An image processing apparatus for producing an animation image according to claim 10, wherein said data identifying quantum is a function of distances to be maintained from said second animated object, and wherein said modifying means comprises:
   means for modifying said motion of said first animated object based on said data identifying a quantum, position information of said first animated object and said second animated object, and said motion of said second animated object, when said second animated object moves.

14. An image processing apparatus for producing an animation image according to claim 9, wherein said modifying means comprises:
   means for modifying said motion of said first animated object by changing a value of acceleration of said first animated object based on said information and said motion of said second animated object.

15. An image processing apparatus for producing an animation image according to claim 9, wherein said modifying means comprises:
   means for modifying said motion of said first animated object by changing a force vector of said first animated object based on said information and said motion of said second animated object.

16. An image processing apparatus for producing an animation image of motion of an animated object, comprising:
   means for storing first information which identifies an initial position and an initial motion of first and second animated objects, second information which identifies an area provided around said second animated object, and third information of a quantum representing how said first animated object and second animated object approach or avoid each other in said area;
   means for modifying said first information of at least one of said first and second animated objects based on said third information when said second animated object moves relative to said first animated object causing position of said first animated object to be included in said area identified by said second information; and
   means for displaying position and motion of said at least one of said first and second animated objects based on said modified first information and displaying position and motion of the other one of said first and second animated objects.

17. A method for producing an animation image in an image processing apparatus, comprising the steps of:
   (a) storing in a memory:
      (a1) first information identifying initial position of points representing respective animated objects and referred to as points to be observed,
      (a2) second information identifying an area around each point to be observed,
      (a3) third information of a quantum given to each point, and
      (a4) fourth information of an observed value of the quantum of a point to be observed, occurring when each animated object is located in the designated area around the point to be observed, and
   performing for each of a plurality of successive frames and for each animated object the steps of:
   (b) determining the quantum of the points to be observed by the animated object, other than its own quantum, and
   (c) modifying the position of the animated object based on a value obtained through observation by the animated object of at least one of quantum given to the points to be observed.

18. A method according to claim 17, wherein said step (c) includes a step of modifying a value of acceleration of the object based on said quantum.

19. A method according to claim 17, wherein said step (c) includes a step of modifying a force vector given the object based on said quantum.

20. A method according to claim 17, wherein said step (c) includes the step of modifying a force vector given the object based on said quantum.

21. A method according to claim 17, wherein said step (c) includes a step of modifying a value of velocity of the object based on said quantum.

22. A method according to claim 17, wherein said area is provided within a fixed distance from the object.

23. A method according to claim 17, wherein said area is provided as a plurality of layers of area.

24. A method according to claim 17, wherein said area is provided as a two-dimensional area.

25. A method according to claim 17, wherein said area is provided as a three-dimensional area.

26. Apparatus for producing an animation image comprising:
   (a) a storage for storing:
      (a1) first information identifying initial position of points representing respective animated objects and referred to as points to be observed,
      (a2) second information identifying an area around each point to be observed,
      (a3) third information of a quantum given to each point, and
      (a4) fourth information of an observed value of the quantum of a point to be observed, on occurring when each animated object is located in the designated area around the point to be observed; and
   means for performing for each of a plurality of successive frames and for each animated object the functions of:
   (b) determining the quantum of the points to be observed by the animated object, other than its own quantum, and
   (c) modifying the position of the animated object based on a value obtained through observation by the said animated object of at least one of quantum given to the points to be observed.

27. Apparatus according to claim 26, wherein said function (c) includes a function of modifying a value of acceleration of the object based on said quantum.

28. Apparatus according to claim 26, wherein said function (c) includes a function of modifying a force vector given the object based on said quantum.

29. Apparatus according to at least one of claims 26, wherein said function (c) includes a function of modifying a value of velocity of the object based on said quantum.

30. Apparatus according to claim 26, wherein said area is provided within a fixed distance from the object.

31. Apparatus according to claim 26, wherein said area is provided as a plurality of layers of area.

32. Apparatus according to claim 26, wherein said area is provided as a two-dimensional area.

33. Apparatus according to claim 26, wherein said area is provided as a three-dimensional area.

* * * * *